United States Patent
Bu et al.

(10) Patent No.: US 11,263,930 B2
(45) Date of Patent: Mar. 1, 2022

(54) FLEXIBLE DISPLAY DEVICE AND HETERO-SHAPED DOUBLE-SIDED ADHESIVE TAPE

(71) Applicant: BOE TECHNOLOGY GROUP CO., LTD., Beijing (CN)

(72) Inventors: Dejun Bu, Beijing (CN); Paoming Tsai, Beijing (CN); Jianwei Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 145 days.

(21) Appl. No.: 16/622,563

(22) PCT Filed: May 28, 2019

(86) PCT No.: PCT/CN2019/088789
§ 371 (c)(1),
(2) Date: Dec. 13, 2019

(87) PCT Pub. No.: WO2019/228342
PCT Pub. Date: Dec. 5, 2019

(65) Prior Publication Data
US 2021/0150941 A1 May 20, 2021

(30) Foreign Application Priority Data
May 28, 2018 (CN) .......................... 201810523461.5

(51) Int. Cl.
*G09F 9/30* (2006.01)
*G06F 3/041* (2006.01)

(52) U.S. Cl.
CPC ............ *G09F 9/301* (2013.01); *G06F 3/0412* (2013.01)

(58) Field of Classification Search
CPC ...... G09F 9/301; G06F 1/1652; G06F 3/0412; G06F 2203/04102; G06F 2202/28;
(Continued)

(56) References Cited

U.S. PATENT DOCUMENTS

| 10,646,957 B2 * | 5/2020 | Bae | B32B 3/30 |
| 2009/0295748 A1 * | 12/2009 | Liu | G06F 3/045 345/173 |

(Continued)

FOREIGN PATENT DOCUMENTS

| CN | 101593053 A | 12/2009 |
| CN | 101833902 A | 9/2010 |

(Continued)

OTHER PUBLICATIONS

The First Office Action dated Jun. 19, 2019 corresponding to Chinese application No. 201810523461.5.

*Primary Examiner* — Joe H Cheng
(74) *Attorney, Agent, or Firm* — Nath, Goldberg & Meyer; Joshua B. Goldberg (57) ABSTRACT

A flexible display device is configured to be bendable along at least one bending axis, have two opposite sides at both ends of the bending axis, respectively, and include a first substrate and a second substrate opposite to each other, and a hetero-shaped double-sided adhesive tape bonding the first substrate and the second substrate to each other on at least one of the two opposite sides. The hetero-shaped double-sided adhesive tape includes a lower adhesive layer, a base material layer, and an upper adhesive layer which are stacked together in sequence. In a stacking direction of the lower adhesive layer, the base material layer and the upper adhesive layer, the upper adhesive layer has a non-overlapping region that does not overlap the lower adhesive layer, (Continued)

and/or the lower adhesive layer has a non-overlapping region that does not overlap the upper adhesive layer.

20 Claims, 4 Drawing Sheets

(58) Field of Classification Search
 CPC ...... G06F 2203/04103; H04M 1/0214; H04M 1/0268; H04M 1/185; G02F 1/133305
 See application file for complete search history.

(56) References Cited

U.S. PATENT DOCUMENTS

| | | | |
|---|---|---|---|
| 2010/0225875 A1 | 9/2010 | Wang et al. | |
| 2011/0050657 A1* | 3/2011 | Yamada | H01L 51/5237 345/204 |
| 2012/0034443 A1* | 2/2012 | Soeda | C09J 7/22 428/220 |
| 2017/0352834 A1* | 12/2017 | Kim | H01L 27/3276 |
| 2017/0364187 A1* | 12/2017 | Zhai | G02F 1/13338 |
| 2018/0114944 A1 | 4/2018 | Son et al. | |
| 2018/0123061 A1* | 5/2018 | Suzuki | H01L 51/5246 |
| 2019/0140201 A1* | 5/2019 | Kim | H01L 51/56 |
| 2019/0220644 A1* | 7/2019 | Sun | H01L 51/56 |
| 2020/0058899 A1* | 2/2020 | Bu | B32B 7/12 |
| 2020/0285281 A1* | 9/2020 | Li | G06F 3/041 |
| 2021/0157431 A1* | 5/2021 | Gu | G06F 1/1652 |
| 2021/0179901 A1* | 6/2021 | Fujita | H01L 27/323 |

FOREIGN PATENT DOCUMENTS

| | | | | |
|---|---|---|---|---|
| CN | 102183858 A | | 9/2011 | |
| CN | 103839900 A | | 6/2014 | |
| CN | 103927941 A | | 7/2014 | |
| CN | 104216589 A | | 12/2014 | |
| CN | 104330923 A | | 2/2015 | |
| CN | 104503629 A | | 4/2015 | |
| CN | 204515723 U | | 7/2015 | |
| CN | 105513497 A | | 4/2016 | |
| CN | 105702170 A | | 6/2016 | |
| CN | 106448463 A | | 2/2017 | |
| CN | 107216819 A | | 9/2017 | |
| CN | 107301822 A | | 10/2017 | |
| CN | 108034373 A | | 5/2018 | |
| CN | 207337020 U | | 5/2018 | |
| CN | 108735101 A | | 11/2018 | |
| JP | 2002129115 A | * | 5/2002 | |
| JP | 201337190 A | | 2/2013 | |
| JP | 2016014075 A | * | 1/2016 | |
| WO | WO-2015039590 A1 | * | 3/2015 | C09J 7/20 |

* cited by examiner

FLEXIBLE DISPLAY DEVICE AND HETERO-SHAPED DOUBLE-SIDED ADHESIVE TAPE

CROSS REFERENCE TO RELATED APPLICATIONS

This is a National Phase Application filed under 35 U.S.C. 371 as a national stage of PCT/CN2019/088789, filed on May 28, 2019, an application claiming the priority of Chinese patent application No. 201810523461.5, filed on May 28, 2018, the contents of each of which are incorporated herein in their entirety by reference.

TECHNICAL FIELD

The present disclosure relates to the field of display technology, and particularly relates to a flexible display device and a hetero-shaped double-sided adhesive tape.

BACKGROUND

With the development of science and technology, flexible display devices have become true. Each of the flexible display devices may include a first substrate and a second substrate which are opposite to each other, and a display panel disposed between the first substrate and the second substrate. Since each of the flexible display devices may be repeatedly bent during use, this may cause the first substrate and the second substrate to be separated from each other, thereby reducing reliability and lifespan of each of the flexible display devices. Therefore, it is desirable to provide an adhesive tape capable of reliably bonding (or connecting) a first substrate and a second substrate of a flexible display device to each other, and to provide a flexible display device having high reliability and long lifespan.

SUMMARY

Embodiments of the present disclosure provide a flexible display device and a hetero-shaped double-sided adhesive tape.

An aspect of the present disclosure provides a flexible display device, configured to be bendable along at least one bending axis, the flexible display device having two opposite sides at both ends of the bending axis, respectively, and the flexible display device including:

a first substrate and a second substrate opposite to each other; and a hetero-shaped double-sided adhesive tape bonding the first substrate and the second substrate to each other on at least one of the two opposite sides, wherein the hetero-shaped double-sided adhesive tape includes a lower adhesive layer, a base material layer, and an upper adhesive layer which are stacked together in sequence, the first substrate and the base material layer are bonded to each other by the lower adhesive layer, and the second substrate and the base material layer are bonded to each other by the upper adhesive layer; and wherein, in a stacking direction of the lower adhesive layer, the base material layer and the upper adhesive layer of the hetero-shaped double-sided adhesive tape, the upper adhesive layer has a non-overlapping region that does not overlap the lower adhesive layer, and/or the lower adhesive layer has a non-overlapping region that does not overlap the upper adhesive layer.

In an embodiment, in an extending direction of the bending axis, each of a size of the upper adhesive layer and a size of the lower adhesive layer is smaller than a size of the base material layer, and a size of an overlapping region of the upper adhesive layer and the lower adhesive layer is smaller than a smaller one of the size of the upper adhesive layer and the size of the lower adhesive layer.

In an embodiment, in the extension direction of the bending axis, the size of the overlapping region of the upper adhesive layer and the lower adhesive layer is smaller than ⅓ of the size of the base material layer.

In an embodiment, the upper adhesive layer and the lower adhesive layer do not overlap each other in the extending direction of the bending axis.

In an embodiment, the first substrate and the second substrate are connected to each other by the hetero-shaped double-sided adhesive tape at each of the two sides at both ends of the bending axis.

In an embodiment, in any one hetero-shaped double-sided adhesive tape, the upper adhesive layer is closer to a center of the flexible display device than the lower adhesive layer; and/or in any one hetero-shaped double-sided adhesive tape, the upper adhesive layer is farther away from the center of the flexible display device than the lower adhesive layer.

In an embodiment, a display region of the flexible display device is rectangular, and the flexible display device has only one bending axis.

In an embodiment, on at least one of the two sides at both ends of the bending axis, at least a part of an edge portion of the first substrate and at least a part of an edge portion of the second substrate are bonded to each other by a uniform-shaped double-sided adhesive tape;

wherein the uniform-shaped double-sided adhesive tape includes a second lower adhesive layer, a second base material layer and a second upper adhesive layer which are stacked together in sequence, the first substrate and the second base material layer are bonded to each other by the second lower adhesive layer, and the second substrate and the second base material layer are bonded to each other by the second upper adhesive layer; and wherein in the extending direction of the bending axis, a size of the second upper adhesive layer, a size of the second base material layer, and a size of the second lower adhesive layer are equal to each other.

In an embodiment, the flexible display device further includes a display component between the first substrate and the second substrate.

In an embodiment, the display component is on the first substrate.

In an embodiment, the display component is connected to the second substrate by an optical adhesive.

In an embodiment, the display component includes any one of a display panel, a display touch panel, and an assembly of the display panel and a touch panel.

In an embodiment, the second substrate is a cover plate and the first substrate is a middle frame.

Another aspect of the present disclosure provides a hetero-shaped double-sided adhesive tape, including a lower adhesive layer, a base material layer, and an upper adhesive layer which are stacked together in sequence, wherein in a stacking direction of the lower adhesive layer, the base material layer and the upper adhesive layer of the hetero-shaped double-sided adhesive tape, the upper adhesive layer has a non-overlapping region that does not overlap the lower adhesive layer, and/or the lower adhesive layer has a non-overlapping region that does not overlap the upper adhesive layer.

In an embodiment, in a direction perpendicular to the stacking direction, each of a size of the upper adhesive layer and a size of the lower adhesive layer is smaller than a size of the base material layer, and a size of an overlapping region of the upper adhesive layer and the lower adhesive layer is smaller than a smaller one of the size of the upper adhesive layer and the size of the lower adhesive layer.

In an embodiment, in the direction perpendicular to the stacking direction, the size of the overlapping region of the upper adhesive layer and the lower adhesive layer is smaller than ⅓ of the size of the base material layer.

In an embodiment, the upper adhesive layer and the lower adhesive layer do not overlap each other in the direction perpendicular to the stacking direction.

In an embodiment, the base material layer is made of a flexible material.

In an embodiment, the base material layer is made of at least one of polyethylene terephthalate, polyethylene naphthalate, cycloolefin polymer, polyimide, and polycarbonate.

In an embodiment, each of the upper and the lower adhesive layer is made of at least one of acrylic, silicon-based resin, polyurethane, and epoxy resin.

DETAILED DESCRIPTION

To enable one of ordinary skill in the art to better understand the technical solutions of the present disclosure, the present disclosure will be further described in detail below with reference to exemplary embodiments and the accompanying drawings.

Figure 7:
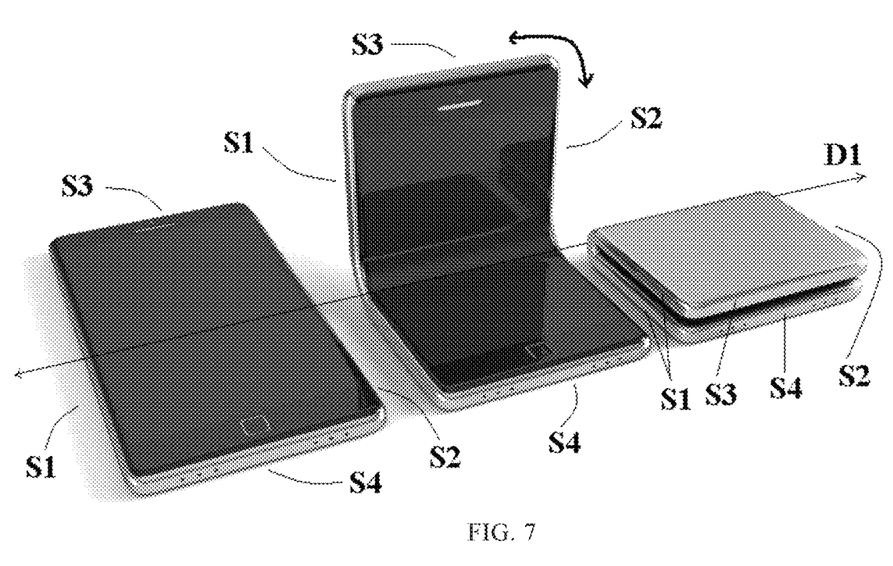
FIG. 7 is a schematic view illustrating bending of a flexible display device according to an embodiment of the present disclosure.

FIG. 7 is a schematic view illustrating bending of a flexible display device according to an embodiment of the present disclosure.

As shown in FIG. 7, the flexible display device is configured to be bendable along at least one bending axis D1, and has two opposite sides S1 and S2 on both ends of the bending axis D1, respectively. Further, the flexible display device further includes two opposite sides S3 and S4 in a direction perpendicular to the bending axis D1. The left part of FIG. 7 shows a state where the flexible display device is not bent, and in this case the flexible display device may have a larger display screen. In a case where a portion (e.g., a lower half) of the flexible display device shown in the left part of FIG. 7 is fixed and a user applies a force to other portion (e.g., an upper half) of the flexible display device as indicated by the double arrow curve in FIG. 7, the other portion may be rotated clockwise by 0 degree to 180 degrees or counterclockwise by 0 degree to 180 degrees about the bending axis D1. For example, the middle part of FIG. 7 shows that the other portion is rotated clockwise by 90 degrees about the bending axis D1, and the right part of FIG. 7 shows that the other portion is rotated clockwise by 180 degrees about the bending axis D1.

The inventors of the present inventive concept have found that, since the flexible display device will be repeatedly bent during use, which may cause the first substrate and the second substrate to be separated from each other, thereby reducing reliability and lifespan of the flexible display device. Accordingly, embodiments of the present disclosure provide an adhesive tape that can reliably bond (or connect) a first substrate and a second substrate of a flexible display device to each other, and provide a flexible display device having high reliability and long lifespan.

Figure 1:
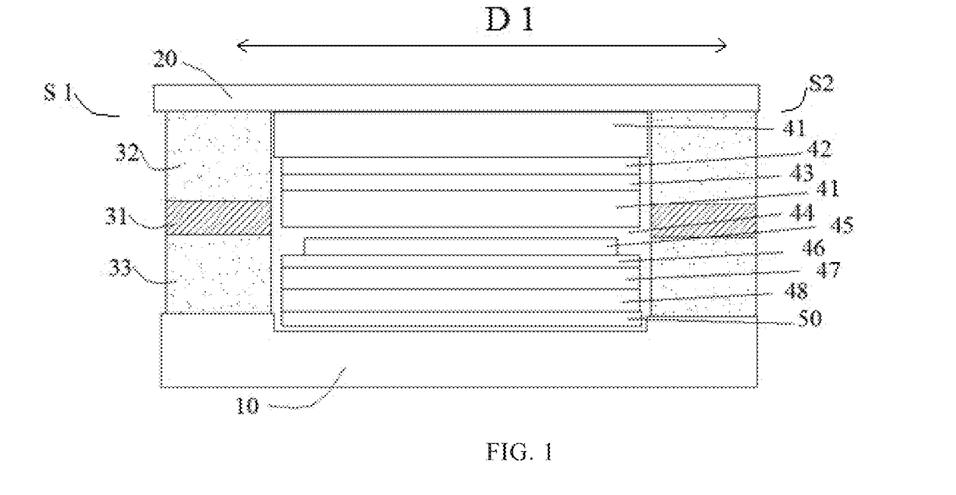
FIG. 1 is a schematic structural diagram of a flexible display device according to an embodiment of the present disclosure.

As shown in FIG. 1, an embodiment of the present disclosure provides a flexible display device. The flexible display device includes a first substrate 10 and a second substrate 20 which are opposite to each other, and a uniform-shaped double-sided adhesive tape that bonds edges of the first substrate 10 and the second substrate 20 together. The uniform-shaped double-sided adhesive tape includes a lower adhesive layer 33, a base material layer 31 and an upper adhesive layer 32 which are sequentially stacked together. In the stacking direction of the lower adhesive layer 33, the base material layer 31 and the upper adhesive layer 32 (i.e., the vertical direction perpendicular to the bending axis D1 as in FIG. 1), the lower adhesive layer 33, the base material layer 31 and the upper adhesive layer 32 have a same (or identical or equal) size (i.e., have a "uniform shape"). In other words, in the stacking direction, the lower adhesive layer 33, the base material layer 31, and the upper adhesive layer 32 completely overlap each other. That is, the upper adhesive layer 32, the base material layer 31, and the lower adhesive layer 33 are aligned with each other in an extending direction of the folding axis D1. Thus, the uniform-shaped double-sided adhesive tape can reliably bond the first substrate and the second substrate together, thereby increasing the lifespan of the flexible display device. In addition, a manufacturing process of the uniform-shaped double-sided adhesive tape is simple. It is shown in FIG. 1 that the uniform-shaped double-sided adhesive tapes are provided at the left side S1 and the right side S2 of the first substrate 10 and the second substrate 20, respectively. Alternatively, the left side S1, the right side S2, the upper side S3, and the lower side S4 of the first substrate 10 and the second substrate 20 as shown in FIG. 1 and in the left part of FIG. 7 may be provided with the uniform-shaped double-sided adhesive tapes, respectively, thereby forming a closed space between the first substrate 10 and the second substrate 20. A display component is disposed within the closed space. FIG. 1 shows a stacked structure of the display component and a peripheral structure of the display component, which include, in the order from the second substrate 20 to the first substrate 10: an optical adhesive (or optically clear adhesive, OCA) 41, a circular polarizer 42, a touch panel (also referred to as touch screen panel, TSP) 43, an optical adhesive 41, a thin film encapsulation layer 44, a light emitting device layer 45, a driving transistor layer 46, a flexible substrate layer 47, a support film 48, and a heat sink 50. A display panel may be formed by the thin film encapsulation layer 44, the light emitting device layer 45, the driving transistor layer 46, and the flexible substrate layer 47.

When the side (e.g., side S3) of the flexible display device is subjected to a force as indicated by the double arrow curve as indicated in the middle part of FIG. 7 to be bent, each of the uniform-shaped double-sided adhesive tapes simultaneously receives a tensile stress in the thickness direction of the flexible display device and a shear stress in the extending direction of the bending axis D1. Since the respective portions of each uniform-shaped double-sided adhesive tape in the thickness direction have the same size, the respective portions may not undergo corresponding deformation easily to relieve the tensile stress and the shear stress. Accordingly, a crack may occur between the uniform double-sided adhesive tape and the first substrate 10 or the second substrate 20.

Therefore, there is provided a double-sided adhesive tape (hereinafter referred to as a hetero-shaped (or special-shaped) double-sided adhesive tape, here the term "hetero-shaped (or special-shaped)" is relative to the term "uniform-shaped" as described above) having high adhesion and capable of effectively relieving the tensile stress and the shear stress, and there is provided a flexible display device having high reliability and long lifespan. Some embodiments of the present disclosure will be described below with reference to FIGS. 2 to 7.

As shown in FIGS. 2 to 6, an embodiment of the present disclosure provides a flexible display device. The flexible display device is configured to be bendable along at least one bending axis D1, and has two opposite sides S1 and S2 at both ends of the bending axis D1, respectively. The flexible display device includes the first substrate 10 and the second substrate 20 which are opposite to each other, and a hetero-shaped double-sided adhesive tape located on at least one of the two opposite sides S1 and S2 to bond (or connect) edge portions of the first and second substrates 10 and 20 to each other. The hetero-shaped double-sided adhesive tape includes a lower adhesive layer 33, a base material layer 31 and an upper adhesive layer 32 which are stacked together in sequence. The first substrate 10 and the base material layer 31 are bonded to each other by the lower adhesive layer 33, and the second substrate 20 and the base material layer 31 are bonded to each other by the upper adhesive layer 32. In the direction perpendicular to the bending axis D1 (i.e., the stacking direction of the lower adhesive layer 33, the base material layer 31, and the upper adhesive layer 32 of the hetero-shaped double-sided adhesive tape), the upper adhesive layer 32 has a non-overlapping region that does not overlap the lower adhesive layer 33, and/or the lower adhesive layer 33 has a non-overlapping region that does not overlap the upper adhesive layer 32. In other words, in the direction perpendicular to the bending axis D1 (i.e., the stacking direction of the lower adhesive layer 33, the base material layer 31, and the upper adhesive layer 32 of the hetero-shaped double-sided adhesive tape), a portion of the upper adhesive layer 32 does not overlap the lower adhesive layer 33, and/or a portion of the lower adhesive layer 33 does not overlap the upper adhesive layer 32. That is, the lower adhesive layer 33, the base material layer 31, and the upper adhesive layer 32 have different sizes in the extending direction of the bending axis D1, and thus they form the double-sided adhesive tape that is "hetero-shaped".

For example, the first substrate 10 may be a middle frame (or a medium frame), and the second substrate 20 may be a cover plate (or a cover film). The middle frame may be a frame located between the cover plate and a bottom plate of the flexible display device. The cover plate may be, for example, a flexible cover plate with a touch function or a flexible cover plate without a touch function.

For example, the base material layer 31 is made of a material having a good bending property (i.e., a flexible material), for example, is made of one or more of polyethylene terephthalate (PET), polyethylene naphthalate (PEN), cycloolefin polymer (COP), polyimide (PI), and polycarbonate (PC). In an embodiment, the base material layer 31 is made of polyimide (PI). Each of the upper adhesive layer 32 and the lower adhesive layer 33 is made of, for example, at least one of acrylic, silicon-based resin, polyurethane, and epoxy resin.

Although some bending ways of the flexible display device are described above. However, embodiments of the present disclosure are not limited thereto. For example, referring to FIGS. 2 to 6, at the viewing angles shown in the figures, a middle region of the flexible display device may "protrude" upwards due to a force, and thus the middle region becomes "higher" than its left and right sides. Alternatively, the middle region of the flexible display device may "dent" downwards due to a force, and thus the middle region becomes "lower" than its left and right sides.

For example, since the upper adhesive layer 32 and the lower adhesive layer 33 are bonded to the base material layer 31, respectively, they should not extend "beyond" boundaries of the base material layer 31 in the extending direction of the bending axis D1.

Figure 2:
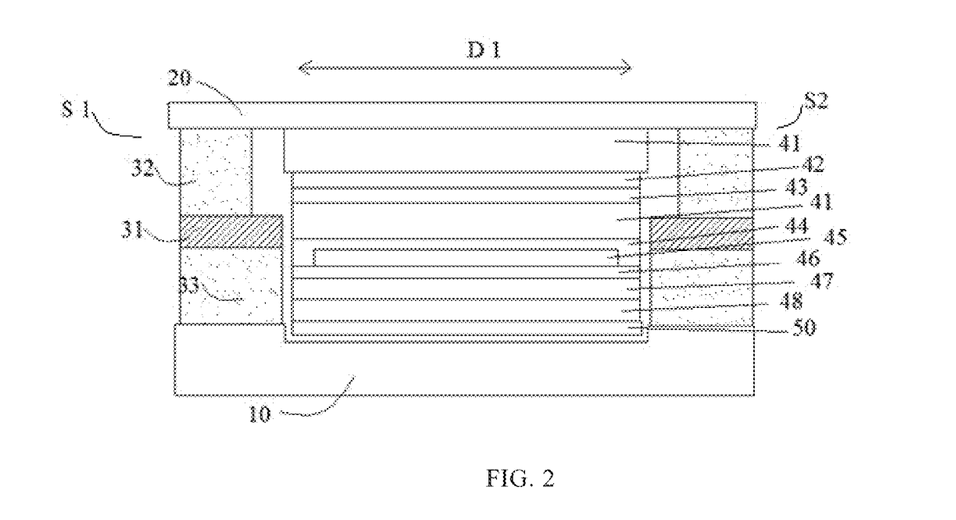
FIG. 2 is a schematic structural diagram of a flexible display device according to an embodiment of the present disclosure.

Further, as shown in FIG. 2, at least one of the adhesive layers (e.g., the lower adhesive layer 33 in FIG. 2) may have a portion (i.e., a right portion of the lower adhesive layer 33 in FIG. 2) that does not overlap the other adhesive layer (e.g., the upper adhesive layer in FIG. 2) in the extending direction of the bending axis D1.

For example, as shown in FIGS. 2 to 6, there are non-overlapping region(s) between the upper adhesive layer 32 and the lower adhesive layer 33, and each of the number of the non-overlapping regions of the upper adhesive layer 32 and the number of the non-overlapping regions of the lower adhesive layer 33 is at most 1. That is, the upper adhesive layer 32 and the lower adhesive layer 33 are disposed at two ends of the base material layer 31 in the extending direction of the bending axis D1, respectively, and there is no case where one adhesive layer is disposed in the middle region of the other adhesive layer such that the other adhesive layer has non-overlapping regions respectively located at its both sides. In other words, the upper adhesive layer 32 is disposed on the upper surface of the base material layer 31, the lower adhesive layer 33 is disposed on the lower surface of the base material layer 31, and the upper adhesive layer 32 and the lower adhesive layer 33 are aligned with two opposite ends of the base material layer 31, respectively.

For example, in the flexible display device shown in FIG. 2, in the extending direction of the bending axis D1, only a size of the upper adhesive layer 32 is smaller than a size of the base material layer 31, and a size of the lower adhesive layer 33 may be equal to the size of the base material layer 31. In FIG. 2, the upper adhesive layer 32 of the left hetero-shaped double-sided adhesive tape is positioned on the left side of the base material layer 31 of the left hetero-shaped double-sided adhesive tape, and the upper adhesive layer 32 of the right hetero-shaped double-sided adhesive tape is positioned on the right side of the base material layer 31 of the right hetero-shaped double-sided adhesive tape. Only each lower adhesive layer 33 has a non-overlapping region that does not overlap the corresponding upper adhesive layer 32 (e.g., the right portion of the left lower adhesive layer 33 does not overlap the upper adhesive layer 32 in the vertical direction).

Figure 3:
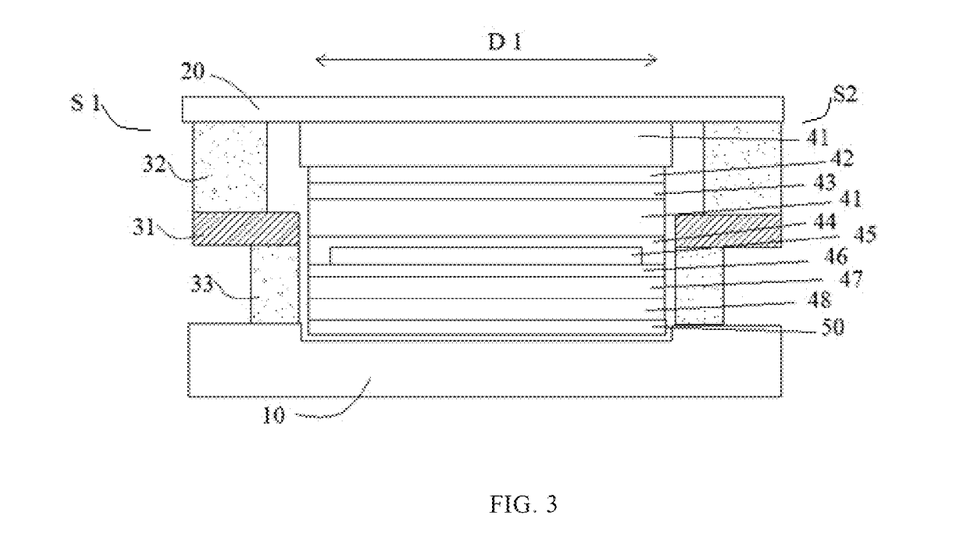
FIG. 3 is a schematic structural diagram of a flexible display device according to an embodiment of the present disclosure.
Figure 4:
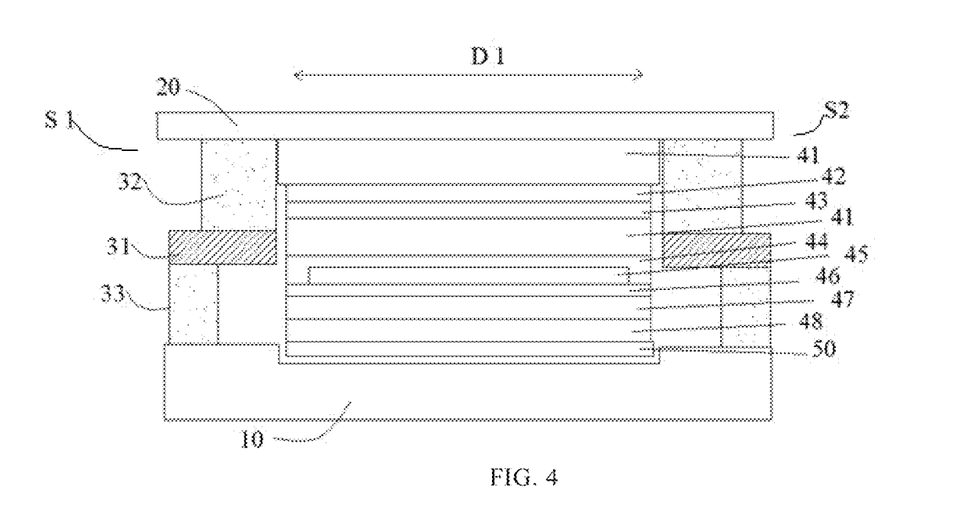
FIG. 4 is a schematic structural diagram of a flexible display device according to an embodiment of the present disclosure.

For example, in FIGS. 2 to 4, the two hetero-shaped double-sided adhesive tapes at the left and right sides of the flexible display device are symmetric with respect to a vertical central axis of the flexible display device. However, embodiments of the present disclosure are not limited thereto. For example, in FIGS. 5 and 6, the two hetero-shaped double-sided adhesive tapes at the left and right sides of the flexible display device are asymmetric with respect to the vertical central axis of the flexible display device.

For example, in the flexible display devices shown in FIGS. 3 and 4, in a same hetero-shaped double-sided adhesive tape, in the extending direction of the bending axis D1, the size of each of the upper adhesive layer 32 and the lower adhesive layer 33 is smaller than that of the base material layer 31, and a size of the overlapping region of the upper adhesive layer 32 and the lower adhesive layer 33 is smaller than the smaller one of the size of the upper adhesive layer 32 and the size of the lower adhesive layer 33. That is, the upper adhesive layer 32 and the lower adhesive layer 33 are "offset right and left".

The various hetero-shaped double-sided adhesive tapes shown in FIGS. 2 to 6 as described above may be manufactured by cutting off a portion of the upper adhesive layer 32 and/or a portion of the lower adhesive layer 33 of the uniform-shaped double-sided adhesive tape shown in FIG. 1.

Since one of the upper and lower adhesive layers 32 and 33 in a same hetero-shaped double-sided adhesive tape has a removed portion relative to the other, the adhesive layer with the removed portion is easier to "swing" (i.e., to undergo corresponding deformation) in the extending direction of the bending axis D1, and the adhesive layer with the removed portion may be subjected to a smaller tensile stress in the thickness direction of the flexible display device, thereby facilitating the reduction or avoidance of delamination and cracking.

Further, since the upper adhesive layer 32 and the lower adhesive layer 33 are offset right and left, the shear stress applied to the corresponding double-sided adhesive tape may also be reduced, which is further beneficial to reducing or avoiding the cracking phenomenon.

For example, in the flexible display devices shown in FIGS. 3 and 4, in a same hetero-shaped double-sided adhesive tape, in the extending direction of the bending axis D1, the size of the overlapping region of the upper adhesive layer 32 and the lower adhesive layer 33 is smaller than ⅓ of the size of the base material layer 31.

That is, the larger the left-right offset of the upper adhesive layer 32 and the lower adhesive layer 33 in a case the upper adhesive layer 32 and the lower adhesive layer 33 overlap each other, the higher the degree of relieving the shear stress on the whole hetero-shaped double-sided adhesive tape, and the smaller the probability of cracking.

Based on the same principle, for example, in a same hetero-shaped double-sided adhesive tape, the upper adhesive layer 32 and the lower adhesive layer 33 do not overlap each other in the extending direction of the bending axis D1 (i.e., a size of an overlapping region is 0). In other words, the upper and lower adhesive layers 32 and 33 are spaced apart from each other by the base material layer 31.

It should be noted that, although only one bending axis D1 is described above, embodiments of the present disclosure are not limited thereto. For example, an embodiment of the present disclosure may provide a flexible display device having a plurality of bending axes D1 (e.g., they are parallel to the bending axis D1 shown in FIGS. 1 to 7). Alternatively, for example, the flexible display device shown in FIG. 3 may further have another bending axis that is perpendicular to the plane in which the cross-section (which is, for example, taken along the bending axis D1) of FIG. 3 lies.

For example, at each of the two sides S1 and S2 on both ends of the bending axis D1, the first substrate 10 and the second substrate 20 are connected to each other by the hetero-shaped double-sided adhesive tape. For example, on at least one of the sides S1 to S4, the first substrate 10 and the second substrate 20 are connected to each other by the hetero-shaped double-sided adhesive tape. For example, at all of the sides S1 to S4, the first substrate 10 and the second substrate 20 are connected to each other by the hetero-shaped double-sided adhesive tapes, respectively.

Figure 5:
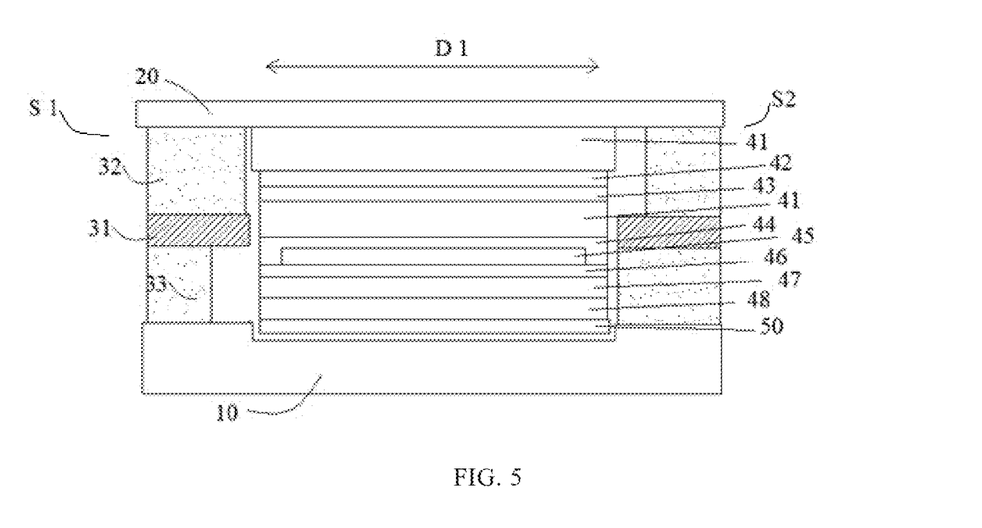
FIG. 5 is a schematic structural diagram of a flexible display device according to an embodiment of the present disclosure.
Figure 6:
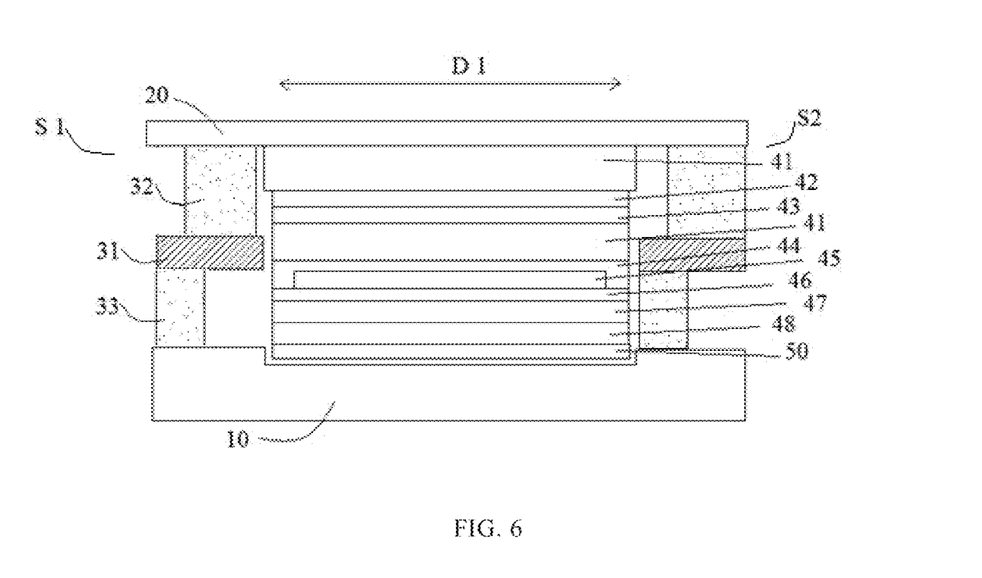
FIG. 6 is a schematic structural diagram of a flexible display device according to an embodiment of the present disclosure.

Referring to FIG. 4, for example, in any one of the hetero-shaped double-sided adhesive tapes, the upper adhesive layer 32 is closer to the center of the flexible display device than the lower adhesive layer 33. Alternatively, as shown in FIG. 3, in any one of the hetero-shaped double-sided adhesive tapes, the upper adhesive layer 32 is farther away from the center of the flexible display device than the lower adhesive layer 33. Alternatively, as shown in FIGS. 5 and 6, in one hetero-shaped double-sided adhesive tape, the upper adhesive layer 32 is closer to the center of the flexible display device than the lower adhesive layer 33, while in another hetero-shaped double-sided adhesive tape opposite to the one hetero-shaped double-sided adhesive tape, the upper adhesive layer 32 is farther away from the center of the flexible display device than the lower adhesive layer 33.

For example, when a central portion of the flexible display device shown in FIG. 3 "protrude" upwards, the hetero-shaped double-sided adhesive tapes shown in FIG. 3 have a better effect of relieving various stresses. When the central portion of the flexible display device shown in FIG. 4 dents downwards, the hetero-shaped double-sided adhesive tapes have a better effect of relieving various stresses.

In an embodiment, a display region of the flexible display device is rectangular, and the flexible display device has only one bending axis D1. For example, the flexible display device in FIG. 3 may have only one bending axis D1.

In an embodiment, at least parts of edge portions on at least one side (any one of the sides S1, S2, S3 and S4 shown in FIG. 7) of the first substrate 10 and the second substrate 20 may be bonded to each other by the uniform-shaped double-sided adhesive tape as shown in FIG. 1. As described above, the uniform double-sided adhesive tape includes the base material layer 31, the upper adhesive layer 32, and the lower adhesive layer 33, the first substrate 10 and the base material layer 31 are bonded to each other by the lower adhesive layer 33, and the second substrate 20 and the base material layer 31 are bonded to each other by the upper adhesive layer 32. In the extending direction of the bending axis D1, the size of the upper adhesive layer 32, the size of the base material layer 31 and the size of the lower adhesive layer 33 are identical. Accordingly, the uniform-shaped double-sided adhesive tape may have greater adhesion to prevent the first substrate 10 and the second substrate 20 from being separated from each other.

In a same uniform-shaped double-sided adhesive tape, the size of the upper adhesive layer 32, the size of the base material layer 31, and the size of the lower adhesive layer 33 are identical in the extending direction of the bending axis D1. That is, the sides of the upper adhesive layer 32, the base material layer 31, and the lower adhesive layer 33 in the extending direction of the bending axis D1 are aligned with each other, as shown in FIG. 1. Replacing a portion of one of the hetero-shaped double-sided adhesive tapes or replacing one of the hetero-shaped double-sided adhesive tapes shown in FIGS. 2 to 6 with the uniform-shaped double-sided adhesive tape can also partially relieve the tensile stress and the shear stress while preventing the first substrate 10 and the second substrate 20 from being separated from each other.

In an embodiment, a display component may be disposed between the first substrate 10 and the second substrate 20, thereby implementing a display function and/or a touch function. For example, the display component may include the circular polarizer 42, the touch panel 43, the optical adhesive 41, the thin film encapsulation layer 44, the light emitting device layer 45, the driving transistor layer 46, the flexible substrate layer 47 and the support film 48 shown in FIGS. 1 to 6.

The display component may be formed on the first substrate 10, for example, directly adhered or fixed on the first substrate 10, or other components, such as the heat sink, may be disposed between the display component and the first substrate. The heat sink may reduce a temperature of the display component.

For example, the display component may be connected to the second substrate 20 by the optical adhesive.

For example, the display component includes: any one of a display panel, an assembly of the display panel and a touch panel, and a display touch panel.

For example, an assembly of a display panel and a touch panel is shown in FIGS. 1 to 6. The display panel may include the thin film encapsulation layer 44, the light emitting device layer 45, the driving transistor layer 46, and the flexible substrate layer 47. The display panel is attached to the heat sink 50 by the support film 48. The display panel is attached to the touch panel 43 by the optical adhesive 41. The circular polarizer 42 is attached to the upper surface (i.e., the surface proximal to the second substrate 20) of the touch panel 43. The second substrate 20 and the circular polarizer 42 are fixed together by another optical adhesive 41.

A structure of the display component in the embodiments of the present disclosure is not limited. Any existing flexible display component and its peripheral structures may be applied to the embodiments of the present disclosure.

Embodiments of the present disclosure provide the hetero-shaped double-sided adhesive tape including the lower adhesive layer 33, the base material layer 31, and the upper adhesive layer 32 stacked together in this order, as shown in FIGS. 2 to 6. In the stacking direction of the lower adhesive layer 33, the base material layer 31, and the upper adhesive layer 32 of the hetero-shaped double-sided adhesive tape (i.e., the vertical direction in FIGS. 2 to 6, or the direction perpendicular to the bending axis D1), the upper adhesive layer 32 has a non-overlapping region that does not overlap the lower adhesive layer 33, and/or the lower adhesive layer 33 has a non-overlapping region that does not overlap the upper adhesive layer 32.

In an embodiment, in a direction perpendicular to the stacking direction, each of the size of the upper adhesive layer 32 and the size of the lower adhesive layer 33 is smaller than the size of the base material layer 31, and the size of the overlapping region of the upper adhesive layer 32 and the lower adhesive layer 33 is smaller than the smaller one of the size of the upper adhesive layer 32 and the size of the lower adhesive layer 33.

In an embodiment, in the direction perpendicular to the stacking direction, the size of the overlapping region of the upper adhesive layer 32 and the lower adhesive layer 33 is smaller than ⅓ of the size of the base material layer 31.

In an embodiment, in the direction perpendicular to the stacking direction, the upper adhesive layer 32 and the lower adhesive layer 33 do not overlap each other, i.e., are spaced apart from each other by the base material layer 31.

In an embodiment, the base material layer 31 is made of a flexible material. For example, the base material layer is made of at least one of polyethylene terephthalate, polyethylene naphthalate, cycloolefin polymer, polyimide, and polycarbonate.

In an embodiment, each of the upper adhesive layer 32 and the lower adhesive layer 33 is made of at least one of acrylic, silicon-based resin, polyurethane, and epoxy resin.

Other structural features and advantages of the hetero-shaped double-sided adhesive tape may refer to the foregoing description and will not be repeated in detail here.

The embodiments of the present disclosure may be combined with each other without explicit conflict.

It is to be understood that the above embodiments are merely exemplary embodiments for explaining the principles of the present disclosure, and the present disclosure is not limited thereto. It will be apparent to one of ordinary skill in the art that various changes and modifications may be made therein without departing from the spirit and essence of the present disclosure, and these changes and modifications are to be considered as falling within the scope of the present disclosure.

What is claimed is:

1. A flexible display device, configured to be bendable along at least one bending axis, the flexible display device having two opposite sides at both ends of the bending axis, respectively, and the flexible display device comprising:
   a first substrate and a second substrate opposite to each other; and
   a hetero-shaped double-sided adhesive tape bonding the first substrate and the second substrate to each other on at least one of the two opposite sides, wherein the hetero-shaped double-sided adhesive tape comprises a lower adhesive layer, a base material layer, and an upper adhesive layer which are stacked together in sequence, the first substrate and the base material layer are bonded to each other by the lower adhesive layer, and the second substrate and the base material layer are bonded to each other by the upper adhesive layer; and
   wherein, in a stacking direction of the lower adhesive layer, the base material layer and the upper adhesive layer of the hetero-shaped double-sided adhesive tape, the upper adhesive layer has a non-overlapping region that does not overlap the lower adhesive layer, and/or the lower adhesive layer has a non-overlapping region that does not overlap the upper adhesive layer.

2. The flexible display device of claim 1, wherein
   in an extending direction of the bending axis, each of a size of the upper adhesive layer and a size of the lower adhesive layer is smaller than a size of the base material layer, and a size of an overlapping region of the upper adhesive layer and the lower adhesive layer is smaller than a smaller one of the size of the upper adhesive layer and the size of the lower adhesive layer.

3. The flexible display device of claim 2, wherein in the extending direction of the bending axis, the size of the overlapping region of the upper adhesive layer and the lower adhesive layer is smaller than ⅓ of the size of the base material layer.

4. The flexible display device of claim 1, wherein the upper adhesive layer and the lower adhesive layer do not overlap each other in an extending direction of the bending axis.

5. The flexible display device of claim 1, wherein the first substrate and the second substrate are connected to each other by the hetero-shaped double-sided adhesive tape at each of two sides at two opposite ends of the bending axis.

6. The flexible display device of claim 1, wherein
in any one hetero-shaped double-sided adhesive tape, the upper adhesive layer is closer to a center of the flexible display device than the lower adhesive layer; and/or
in any one hetero-shaped double-sided adhesive tape, the upper adhesive layer is farther away from the center of the flexible display device than the lower adhesive layer.

7. The flexible display device of claim 1, wherein a display region of the flexible display device is rectangular, and the flexible display device has only one bending axis.

8. The flexible display device of claim 1, wherein on at least one of two sides at two opposite ends of the bending axis, at least a part of an edge portion of the first substrate and at least a part of an edge portion of the second substrate are bonded to each other by a uniform-shaped double-sided adhesive tape;
wherein the uniform-shaped double-sided adhesive tape comprises a second lower adhesive layer, a second base material layer and a second upper adhesive layer which are stacked together in sequence, the first substrate and the second base material layer are bonded to each other by the second lower adhesive layer, and the second substrate and the second base material layer are bonded to each other by the second upper adhesive layer; and
wherein in an extending direction of the bending axis, a size of the second upper adhesive layer, a size of the second base material layer, and a size of the second lower adhesive layer are equal to each other.

9. The flexible display device of claim 1, further comprising a display component between the first substrate and the second substrate.

10. The flexible display device of claim 9, wherein the display component is on the first substrate.

11. The flexible display device of claim 9, wherein the display component is connected to the second substrate by an optical adhesive.

12. The flexible display device of claim 9, wherein the display component comprises:
any one of a display panel, a display touch panel, and an assembly of the display panel and a touch panel.

13. The flexible display device of claim 1, wherein the second substrate is a cover plate and the first substrate is a middle frame.

14. A hetero-shaped double-sided adhesive tape, comprising a lower adhesive layer, a base material layer, and an upper adhesive layer which are stacked together in sequence, wherein
in a stacking direction of the lower adhesive layer, the base material layer and the upper adhesive layer of the hetero-shaped double-sided adhesive tape, the upper adhesive layer has a non-overlapping region that does not overlap the lower adhesive layer, and/or the lower adhesive layer has a non-overlapping region that does not overlap the upper adhesive layer.

15. The hetero-shaped double-sided adhesive tape of claim 14, wherein
in a direction perpendicular to the stacking direction, each of a size of the upper adhesive layer and a size of the lower adhesive layer is smaller than a size of the base material layer, and a size of an overlapping region of the upper adhesive layer and the lower adhesive layer is smaller than a smaller one of the size of the upper adhesive layer and the size of the lower adhesive layer.

16. The hetero-shaped double-sided adhesive tape of wherein in the direction perpendicular to the stacking direction, the size of the overlapping region of the upper adhesive layer and the lower adhesive layer is smaller than ⅓ of the size of the base material layer.

17. The hetero-shaped double-sided adhesive tape of claim 14, wherein the upper adhesive layer and the lower adhesive layer do not overlap each other in a direction perpendicular to the stacking direction.

18. The hetero-shaped double-sided adhesive tape claim 14, wherein the base material layer is made of a flexible material.

19. The hetero-shaped double-sided adhesive tape of claim 14, wherein the base material layer is made of at least one of polyethylene terephthalate, polyethylene naphthalate, cycloolefin polymer, polyimide, and polycarbonate.

20. The hetero-shaped double-sided adhesive tape of claim 14, wherein each of the upper and the lower adhesive layer is made of at least one of acrylic, silicon-based resin, polyurethane, and epoxy resin.

* * * * *